Poppy & Colegrove,
Windlass Water Elevator,
№ 36,792.    Patented Oct. 28, 1862.
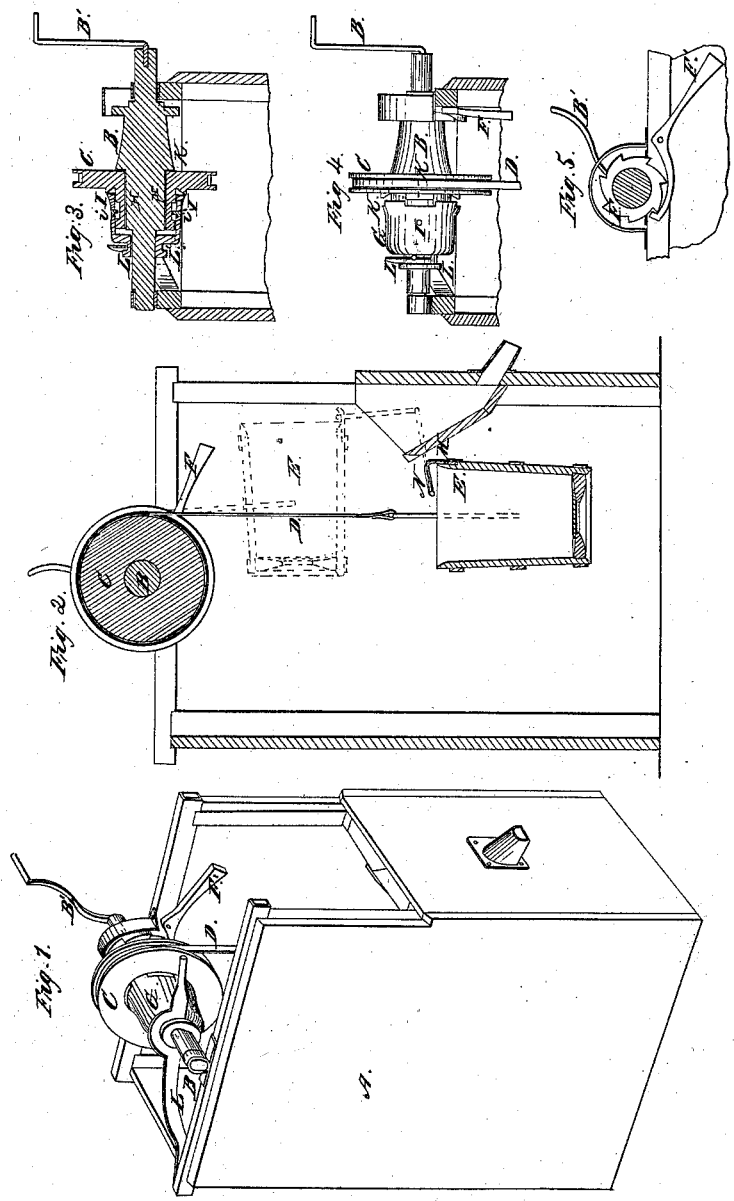

UNITED STATES PATENT OFFICE.

G. A. POPPY AND C. H. COLEGROVE, OF ROCHESTER, OHIO.

IMPROVEMENT IN WATER-ELEVATORS.

Specification forming part of Letters Patent No. 36,792, dated October 28, 1862.

*To all whom it may concern:*

Be it known that we, G. A. POPPY and C. H. COLEGROVE, of Rochester, in the county of Lorain and State of Ohio, have invented new and useful Improvements in Water-Drawers; and we do hereby declare that the following is a full and complete description of the construction and operation of the same, reference being had to the accompanying drawings, making part of this specification, in which—

Figure 1 is a perspective view. Fig. 2 is a vertical section; and Figs. 3, 4, and 5 are detached sections.

My invention relates to the windlass-pulley, and balance-pawl, and compound clutch and brake.

The curb A is of ordinary construction. Across the top, in suitable boxes, is placed the windlass-shaft B, which is rotated by means of the crank B'. Upon the center of this shaft is placed the windlass-pulley C, having a flat groove upon its periphery to receive the strap D, to which the bucket E is attached. One end of this strap is made fast to the pulley, and the other end is secured to the bail of the bucket. The bucket is of ordinary construction, with a valve in the bottom, through which the bucket fills. The pulley C runs freely upon the shaft B, but may be caused to rotate with it by means of a clutch hereinafter to be described. The crank end of the shaft B is provided with a ratchet-wheel, F, having a balance pawl, F', so arranged, as seen in Fig. 5, that the windlass can never run backward, except when the weighted end of the pawl is raised.

Upon the opposite end of the shaft B is placed the compound clutch and brake G. This embraces the shaft B and the hub of the pulley C like a sleeve, and by means of a flattened surface upon the shaft B, which the sleeve fits, is caused to rotate with the shaft.

At H, Fig. 3, the hub of the pulley C has a groove encircling it, into which the pins I I project from the inner surface of the sleeve, and these pins, when pressed outward against the shoulder of the groove H, as indicated by the red lines in Fig. 3 at $i$, operate as a brake to prevent the pulley from running too rapidly in the descent of the bucket.

Upon the side of the pulley next to the clutch G are projections K, which fit into like projections on the inner end of the clutch G, so that when the clutch is brought into contact with the pulley the two are firmly locked together. The clutch is moved back and forth upon the shaft B by means of a lever, L, the middle portion of which forms a yoke which fits into the groove L' in the outer end of the clutch G, as seen in Figs. 1, 3, and 4. One end of the lever L is attached to the curb, and the other end projects in front of the shaft B, where it can be seized by the left hand while the right hand operates the crank. Thus, by a horizontal movement of the left hand toward the crank the clutch is caused to lock with the pulley C, so that the rotation of the shaft B causes a like rotation of the pulley, and a movement of the hand away from the crank releases the clutch from the pulley, so that it may rotate upon the shaft while the shaft remains at rest. Upon the front side of the bucket is placed a spur or pin, M, which, when the bucket ascends, passes within the stationary bail N, attached to the curb, and as the bucket rises brings it into the position seen in Fig. 2 at E', thus discharging the water into the spout. Now, by releasing the clutch from the pulley C the bucket will descend into the well, and the rapidity of descent can be regulated by means of the brake hereinbefore described. The lever L is so attached to the curb that it forms a spring, the tendency of whose action is to press the clutch constantly against the pulley C, so that the clutch is in no danger of being out of lock with the pulley unless pressed away by the hand, as above stated.

What we claim as our invention, and desire to secure by Letters Patent, is—

The compound clutch and brake G, in combination with the spring-lever L, weighted pawl F', and pulley C, when these parts are constructed, arranged, and operated as and for the purpose herein set forth.

G. A. POPPY.
C. H. COLEGROVE.

Witnesses:
W. H. BURRIDGE,
HENRY VOTH.